United States Patent [19]

Armstrong et al.

[11] Patent Number: 5,240,361

[45] Date of Patent: Aug. 31, 1993

[54] LIMITED FORCE CARTRIDGE FOR TEMPORARY FASTENERS

[75] Inventors: Thomas E. Armstrong, Issaquah; Gary M. Moon, Auburn, both of Wash.

[73] Assignee: The Boeing Company, Seattle, Wash.

[21] Appl. No.: 695,179

[22] Filed: May 3, 1991

[51] Int. Cl.$^5$ .................. F16B 43/00; F16B 13/06; F16B 39/24; F16B 21/00

[52] U.S. Cl. .................. 411/371; 411/60; 411/132; 411/347; 411/535

[58] Field of Search .............. 411/60, 57, 8, 11, 12, 411/9, 10, 14, 44, 45, 548, 552, 908, 116, 132, 535, 536, 371, 347, 81, 83, 117, 45; 269/48.2, 48.3, 48.4

[56] References Cited

U.S. PATENT DOCUMENTS

| | | | |
|---|---|---|---|
| 2,241,609 | 5/1941 | McClelland et al. | 269/48.4 |
| 2,317,315 | 2/1942 | Wallace . | |
| 2,439,531 | 4/1948 | Wallace | 269/48.4 |
| 2,830,486 | 4/1958 | Dillon | 411/9 |
| 3,000,086 | 9/1961 | Davis | 29/271 X |
| 3,426,399 | 2/1969 | Jones | 411/57 X |
| 3,495,907 | 2/1970 | Rogers et al. . | |
| 3,568,562 | 3/1971 | Harwood | 269/48.3 |
| 3,605,491 | 9/1971 | Sean . | |
| 4,399,685 | 8/1983 | Atkey . | |
| 4,821,381 | 4/1989 | Kaneko et al. | 411/908 X |
| 4,854,797 | 8/1989 | Gourd | 411/908 X |
| 4,892,449 | 1/1990 | Groxton | 411/14 X |
| 4,934,884 | 6/1990 | Rooke | 411/14 X |

FOREIGN PATENT DOCUMENTS 699246 11/1979 U.S.S.R. .................. 411/8
1105083 3/1965 United Kingdom .

Primary Examiner—Rodney M. Lindsey
Attorney, Agent, or Firm—Elizabeth F. Harasek; B. A. Donahue

[57] ABSTRACT

A force limiting cartridge comprises a housing and end cap which screw together to contain a slidable piston biased by a coil spring. The cartridge surrounds a conventional pull-up clamp. The bottom end of the cartridge pushes against the top layer of the laminate. The piston is pushed against the spring when the clamp screw is tightened. The piston is provided with a cross mark which when aligned with cross hairs on the housing indicate a desired clamping pressure has been attained. The cartridge can be calibrated to any desired pressure (depending on the spring's performance characteristics) by adjusting the total length of the housing/end cap assembly.

11 Claims, 2 Drawing Sheets

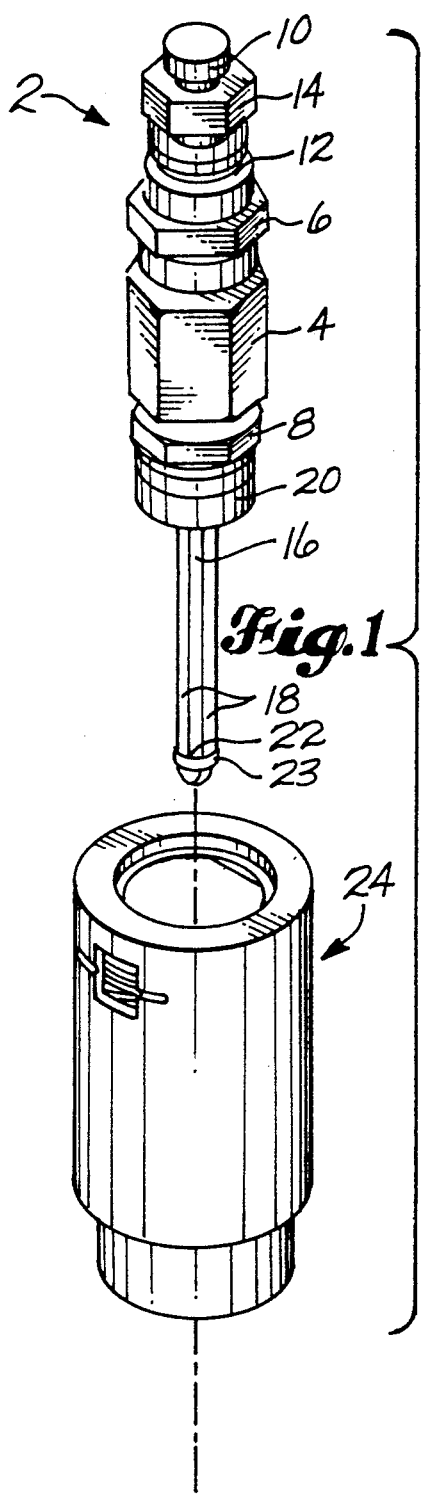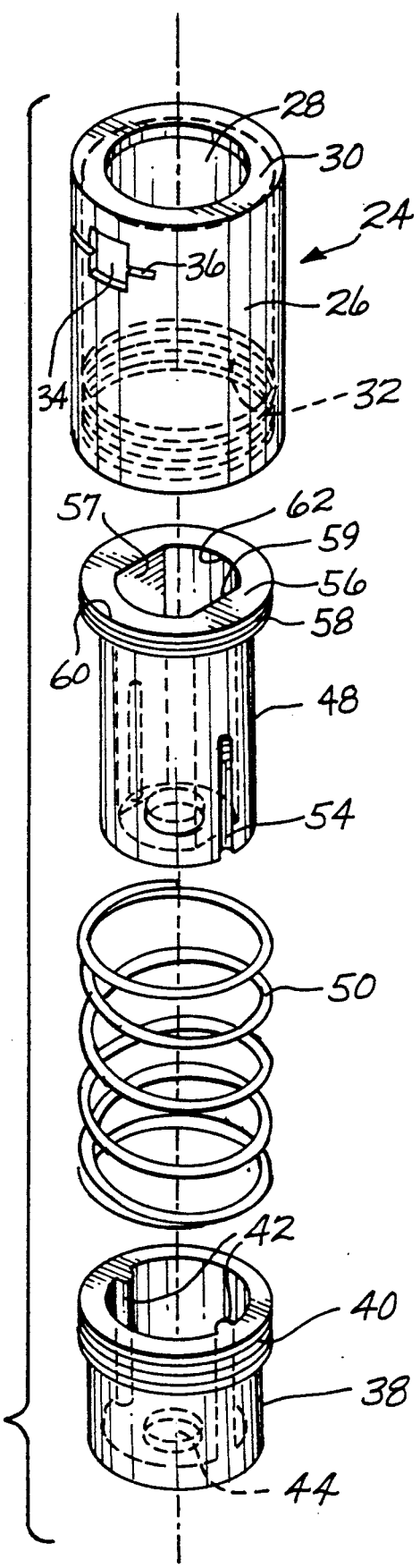

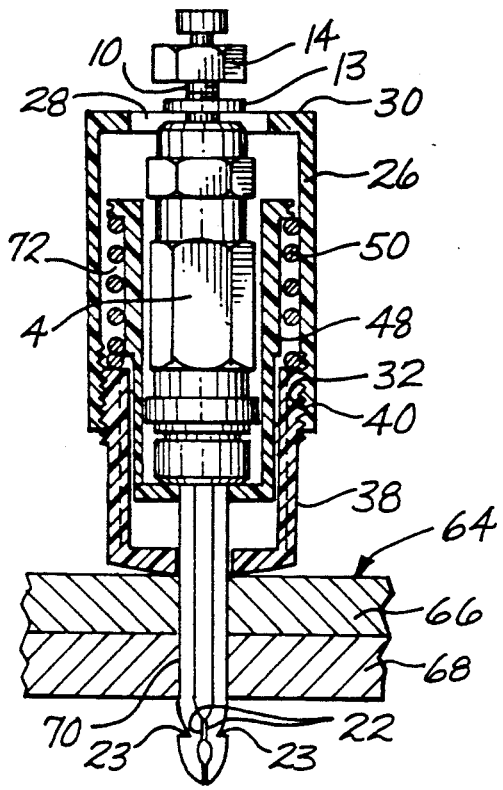
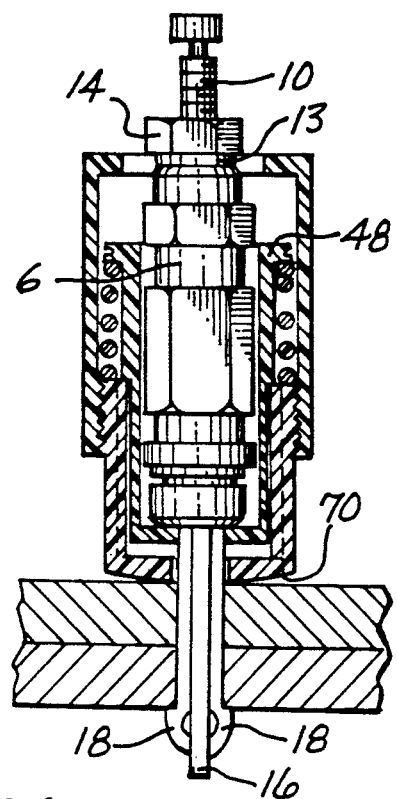
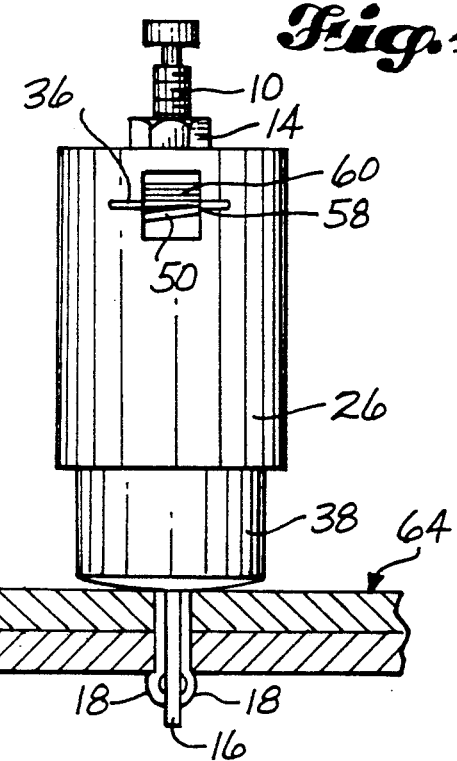

LIMITED FORCE CARTRIDGE FOR TEMPORARY FASTENERS

This invention was reported as a subject invention under contract to the United States Government.

This invention relates to a novel means for applying exact, predetermined clamping pressures using conventional reusable temporary fasteners.

BACKGROUND

In the manufacture of multilayer composite panels, it is desirable to temporarily clamp the layers together preliminary to gluing or permanent fastening. This may be done with reusable temporary fasteners which have splayed hook clamps such as Clecos TM. A small hole is drilled through all the laminate layers and the clamp is inserted through it. Clamping pressure is applied by tightening a screw which extends a pin between the hooked wires of the clamp to separate them.

A problem with such clamps is consistently obtaining a desired clamping Pressure. Too much pressure may damage laminate layers and too little may result in poor bonding.

One prior art means for limiting the force applied by such clamps is shown in U.S. Pat. No. 3,568,562 to Harwood. Harwood shows an arrangement of a housing, Belleville springs and a force control washer (details 38, 40 and 42) to apply predetermined clamping forces with a reusable temporary fastener. However, this spring and housing arrangement limits the number of clamping pressures which can be applied and is not infinitely variable. Moreover, the force limiting device requires an extra long screw of the Cleco TM to accommodate its full length. Variations in laminate thickness also result in different clamp pressures. This can be a serious problem with clamping carbon fiber reinforced laminates which may not have uniform thicknesses.

The subject invention provides a superior force limiting device for reusable temporary fasteners which overcomes the shortcomings of such prior art devices and features a number of other significant advantages which will be described in more detail.

SUMMARY OF THE INVENTION

In accordance with a preferred embodiment, a force limiting cartridge comprises a housing and end cap which screw together to contain a slidable piston which is biased by a coil spring. The cartridge surrounds a splayed hook clamp body. The bottom end of the cartridge pushes against the top layer of the laminate.

The piston is Pushed against the spring when the clamp screw is tightened. The piston is provided with a cross mark which when aligned with cross hairs on the housing indicate a desired clamping pressure has been attained. The cartridge can be calibrated to any desired pressure (depending on the spring's performance characteristics) by adjusting the total length of the housing-/end cap assembly.

Our invention will be better understood in view of the several figures and detailed description which follow.

BRIEF DESCRIPTION OF THE DRAWINGS

FIG. 1 is an exploded perspective view of a splayed hook Cleco TM clamp and a force limiting cartridge in accordance with the invention.

FIG. 2 is an exploded perspective view of the force limiting cartridge of FIG. 1 showing the housing, end cap, piston and coil spring.

FIG. 3 is a front view, partly in section, of a temporary reusable fastener and force limiting cartridge in position preparatory to applying clamping pressure to a two layer laminate.

FIG. 4 is like FIG. 3 after the clamp screw has been tightened and the desired clamping pull-up pressure has been applied.

FIG. 5 is a front view of FIG. 4.

DETAILED DESCRIPTION OF THE INVENTION

Referring to FIG. 1, a pull-up clamp 2 is shown. The clamp comprises a body 4 with integral top nut 6 and bottom nut 8. Adjustment screw 10 extends through clamp body 4. Plate 12 is biased by a spring (not shown) inside body 4. As nut 14 is tightened on screw 10, splay pin 16 moves between hooks 18 which are retained by clamp cap 20. As splay pin 16 reaches tangs 22 on the inside of hooks 18 they are splayed apart. Tangs 23 on the outside of hooks 18 pull up on the laminate through which they are extended.

In accordance with this invention, pull-up clamp 2 is inserted into limited force cartridge 24 to achieve consistent, calibrated, pull-up pressures using a conventional pull-up clamp of the type described above. Referring to FIG. 2, limited force cartridge 24 is shown in an exploded-perspective view. It comprises a housing 26 which has a cylindrical inner bore 28 and shoulder 30. Threads 32 are located inside cylindrical bore 28. Window 34 is located near the top of housing 26 and has cross hairs 36. End cap 38 screws into housing 26 at cap threads 40. Bosses 42 are located on the inside bore 46 to prevent relative motion of piston 48 when limited force cartridge 24 is assembled. Hole 44 in end cap 38 is sized to allow hooks 18 and splay pin 16 to pass through it. Coil spring 50 is sized to fit between housing 26 and the outside surface of piston 48. Notches 54 in piston 48 accommodate bosses 42. Shoulder 56 is sized to fit within inner cylindrical bore 28 of housing 26. The shape of inner bore 62 of piston 48 is a circular cylinder truncated at locations 57 and 59 to prevent rotation of a clamp body 4 when a clamp 2 is being tightened by turning adjustment screw 10.

A line 58 is provided on perimeter 60 of shoulder 56 which lines up in window 34 when limited force cartridge 24 is assembled to indicate a desired clamp pressure has been reached. Coil spring 50 is chosen to have a suitable strength or spring rate to achieve the desired pull-up clamp pressure range. Hole 62 in shoulder 56 is shaped to prevent rotation of pull-up clamp 2 within cartridge 24. Particularly, cartridge 24 is sized so that hole 62 engages fixed top nut 6 of pull-up clamp 2.

FIG. 3–5 show how the subject limited force cartridge operates to apply pull-up pressure to a laminate 64 comprised of top layer 66 and bottom layer 68. Preparatory to clamping, a hole 70 is drilled through laminate 64. Pull-up clamp is inserted into limited force cartridge 24. FIG. 3 shows the assembly before pull-up pressure is applied to laminate 64. FIG. 4 shows a cross section of the assembly in clamping position. Nut 14 is rotated on adjustment screw 10 pushing washer 13 into shoulder 30. Splay Pin 16 extends between hooks 18 splaying them and causing hooks 18 to pull up on the bottom of layer 68. Spring 50 is compressed by piston 48, determining the amount of pull-up pressure of hooks 18. Bottom 70 of cap 38 has a gently contoured convex shape. This reduces any chance of damaging laminate 64 in the clamping process.

FIG. 5 shows a side-view of FIG. 4 particularly pointing out that line 58 on shoulder 56 of piston 48 is lined up in window 34 with cross hairs 36 when a predetermined pull-up clamping force has been reached.

The limited force cartridge is pre-calibrated by adjusting the relative overall length of cavity 72 formed between housing 26 and end cap 38. In the embodiment shown, this is done simply by screwing or unscrewing end cap 38 in housing 26 until cross hairs 58 are aligned with marks 36 at the predetermined pull-up force. The compression of coil spring 50, determined by the length of housing 26 and cap 38, thereby determines the calibrated pull-up force.

EXAMPLE

Concentric limited force cartridges as described above were injection molded from polycarbonate filled with 10% glass fiber. A coil spring was chosen which applied a pull-up pressure of about 10 to 25 pounds.

The cartridge was assembled and calibrated to the desired pull-up force by measuring the pull-up force while the cross hairs on the cartridge body and piston were aligned. Where the same pressure was desired for extended use of such cartridges, the threads between the housing and piston were sealed with Scotch Seal 1252 Tamper Proof TM. Such calibrated cartridges may be used on laminates of various thicknesses and are particularly useful when laminating layers of uneven thickness.

While our invention has been described in terms of specific embodiments thereof, other forms may be readily adapted by one skilled in the art. Accordingly, the scope of this is invention is to be limited only in accordance with the following claims.

We claim:

1. A force limiting cartridge for use with a reusable pull-up fastener, said cartridge consisting essentially of a housing comprising a cylinder having a top shoulder, an internal bore in said housing, and a window in said cylinder near its top; a piston having a flange at its top, said flange being sized to slide within said bore in said housing, a piston body sized such that a space is created between said body and said bore in said housing, and a channel within said piston sized to receive a said fastener and shaped to prevent the rotation of a said fastener therein; a coil spring located in said space between said piston body and said housing bore; and an end cap for said housing, said cap retaining said piston and said spring within said housing; wherein said cartridge, the spring is compressed when a said pull-up fastener is tightened and whereby said piston is pushed downward in said housing and the flange of said piston is located in said window at a calibrated pull-up pressure.

2. The cartridge of claim 1 where the housing, piston and cap comprise a molded polymeric material.

3. The cartridge of claim 1 which is calibrated to a desired pull-up pressure by compressing said spring between said piston flange and said end cap.

4. The cartridge of claim 1 where the housing, piston and cap comprise molded polycarbonate filled with glass fiber.

5. The cartridge of claim 1 where a marking is provided on the outside of said housing adjacent said window such that a desired pull-up pressure is attained when said piston flange is aligned in said window with said marking.

6. A force limiting cartridge for use with a reusable pull-up fastener, said cartridge consisting essentially of a housing comprising a cylinder having a top shoulder, an internal bore in said housing, a window in said cylinder near its top, and a screw thread in the bore near the bottom; a piston having a flange at its top, said flange being sized to slide within said bore in said housing, a piston body sized such that a space is created between said piston body and said bore in said housing, a channel within said piston sized to receive a said fastener and shaped to prevent the rotation of a said fastener therein, and a recess on the outside of said body near at the bottom of said piston; a coil spring located in said space between said piston body and said housing bore; and an end cap for said housing, said cap having complementary threads to the threads in said bore and said cap having a protrusion to complement said recess on said piston, said cap retaining said piston and said spring within said housing; wherein said cartridge, said spring is compressed when a said pull-up fastener is tightened and whereby said piston is pushed downward in said housing and the flange of said piston is located in said window at a calibrated pull-up pressure.

7. The cartridge of claim 6 where the housing, piston and cap comprise a molded polymeric material.

8. The cartridge of claim 6 where the housing, piston and cap comprise molded polycarbonate filled with glass fiber.

9. The cartridge of claim 6 which is calibrated to a desired pull-up pressure by compressing said spring between said piston flange and said end cap.

10. The cartridge of claim 6 which is calibrated to a desired pull-up pressure by screwing said end cap into said housing and thereby compressing said spring between said piston flange and said end cap.

11. The cartridge of claim 6 where a marking is provided on the outside of said housing adjacent said window such that a desired pull-up pressure is attained when said piston flange is aligned in said window with said marking.

* * * * *

UNITED STATES PATENT AND TRADEMARK OFFICE
CERTIFICATE OF CORRECTION

PATENT NO. : 5,240,361
DATED : August 31, 1993
INVENTOR(S) : Armstrong, Thomas E.

It is certified that error appears in the above-indentified patent and that said Letters Patent is hereby corrected as shown below:

On the title page, Item [75] Inventors:
      Add --Lawrence D. Rissler, Simner, Wash.--

Signed and Sealed this

Twelfth Day of April, 1994

*Attest:*

BRUCE LEHMAN

*Attesting Officer*     *Commissioner of Patents and Trademarks*